United States Patent
Steyer et al.

(10) Patent No.: US 11,409,841 B2
(45) Date of Patent: Aug. 9, 2022

(54) METHOD FOR DETECTING AN OBJECT

(71) Applicant: Bayerische Motoren Werke Aktiengesellschaft, Munich (DE)

(72) Inventors: Sascha Steyer, Munich (DE); Georg Tanzmeister, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 83 days.

(21) Appl. No.: 16/961,311

(22) PCT Filed: Jan. 11, 2019

(86) PCT No.: PCT/DE2019/100022
§ 371 (c)(1),
(2) Date: Jul. 10, 2020

(87) PCT Pub. No.: WO2019/141311
PCT Pub. Date: Jul. 25, 2019

(65) Prior Publication Data
US 2021/0073321 A1    Mar. 11, 2021

(30) Foreign Application Priority Data
Jan. 17, 2018 (DE) .......................... 102018200683.0

(51) Int. Cl.
*G06F 17/18* (2006.01)
*G06V 20/58* (2022.01)

(52) U.S. Cl.
CPC .............. *G06F 17/18* (2013.01); *G06V 20/58* (2022.01)

(58) Field of Classification Search
CPC ....................... G06F 17/18; G06K 9/00805
See application file for complete search history.

(56) References Cited

U.S. PATENT DOCUMENTS

2008/0252433 A1* 10/2008 Yguel ................... G08G 1/164
340/435
2015/0310146 A1   10/2015 Tanzmeister
2016/0378115 A1* 12/2016 Yoo ........................ G01S 17/89
701/36

FOREIGN PATENT DOCUMENTS

DE    102009007395 A1   10/2009
WO    2018142395 A1    8/2018

OTHER PUBLICATIONS

Nguyen et al., "Stereo-Camera-Based Urban Environment Perception Using Occupancy Grid and Object Tracking" IEEE Transactions on Intelligent Transportation Systems, vol. 13, No. 1, Mar. 2012 (Year: 2012).*

(Continued)

*Primary Examiner* — John C Kuan
(74) *Attorney, Agent, or Firm* — 2SPL Patent Attorneys PartG mbB; Yong Beom Hwang

(57) ABSTRACT

The invention relates to a method for detecting an object in a spatial region. The method comprises the following steps for each cell of a plurality of cells of the spatial region: determining evidence masses for the hypotheses that a cell is occupied, is not occupied, or may not be occupied at a current point in time on the basis of sensor data relating to the spatial region; determining predicted evidence masses for the hypotheses at the current point in time on the basis of actual evidence masses for a hypothesis at a previous point in time and on the basis of a plurality of particles for a corresponding plurality of movement hypotheses for the cell; and determining the actual evidence masses at the actual point in time by combining the measured evidence masses with the predicted evidence masses at the current point in time.

17 Claims, 3 Drawing Sheets

(56) References Cited

OTHER PUBLICATIONS

Högger, "Dempster Shafer Sensor Fusion for Autonomously Driving Vehicles" Trita Trita-EE 2016:078 (Year: 2016).*

Li et al., "LIDAR-based Dynamic Environment Modeling and Tracking Using Particles Based Occupancy Grid" Proceedings of 2016 IEEE International Conference on Mechatronics and Automation Aug. 7-10, Harbin, China (Year: 2016).*

F. Schuster, M. Wörner, C.G. Keller, M. Haueis, C. Curio: Robust Localization based on Radar Signal Clustering. In: IEEE Intelligent Vehicles Symposium (IV), Gothenburg, Sweden, Jun. 19-22, 2016, pp. 839-844.

Stefan Hoerman, Martin Bach, Klaus Dietmayer: Dynamic Occupancy Grid Prediction for Urban Autonomous Driving: A Deep Learning Approach with Fully Automatic Labeling. In: Cornell University Library, Submitted on May 24, 2017 (v1), last revised Nov. 7, 2017, 1-8.

You Li, Yassine Ruichek: Occupancy Grid Mapping in Urban Environments from a Moving On-Board Stereo-Vision System, Sensors (Basel). Jun. 2014; 14(6): 10454-10478, https://www.ncbi.nlm.nih.gov/pmc/articles/PMC4118354.

Georg Tanzmeister et al.: Evidential Grid-Based Tracking and Mapping, IEEE Transactions on Intelligent Transportation Systems, IEEE, Piscataway, NJ, USA, Bd. 18, Nr. 6, Jun. 6, 2017, pp. 1454-1467.

Sascha Steyer et al.: Object tracking based on evidential dynamic occupancy grids in urban environments, 2017 IEEE Intelligent Vehicles Symposium (IV), IEEE, Jun. 11, 2017, pp. 1064-1070.

Georg Tanzmeister et al.: Grid-based mapping and tracking in dynamic environments using a uniform evidential environment representation, 2014 IEEE International Conference on Robotics and Automation (ICRA), IEEE. May 31, 2014, pp. 6090-6095.

* cited by examiner

METHOD FOR DETECTING AN OBJECT

CROSS-REFERENCE TO RELATED APPLICATIONS

This application is a 35 U.S.C. § 371 national stage entry of PCT Application PCT/DE2019/100022, filed on Jan. 11, 2019. That application claims priority to German Application No. 10 2018 200 683.0 filed on Jan. 17, 2018. The contents of the earlier filed applications are incorporated by reference herein in their entirety.

TECHNICAL FIELD

The invention relates to a method and a corresponding processing unit which, for example, enable a vehicle to detect and/or track an object in the vicinity of the vehicle on the basis of sensor data.

BACKGROUND

A vehicle typically comprises a plurality of different environment sensors that are designed to collect different sensor data related to an environment of the vehicle. Exemplary environment sensors are radar sensors, ultrasonic sensors, Lidar sensors, image sensors, etc. Based on the sensor data from one or more environment sensors of a vehicle, one or more objects (e.g. one or more other vehicles) may be detected in an environment of the vehicle.

The present document deals with the technical task of providing a method and a corresponding processing unit by means of which an object may be detected and tracked in a precise and robust manner, especially in the environment of a vehicle. Special focus is placed on avoiding and/or reducing the loss of information caused by temporary masking.

SUMMARY

This object is solved by the independent claim. Advantageous embodiments are described in the dependent claims, among other things. It should be noted that additional features of a claim which is dependent on an independent claim, without the features of the independent claim or only in combination with a subset of the features of the independent claim, may form a separate invention, which is independent on the combination of any features of the independent claim, wherein the invention may be the subject matter of an independent claim, a divisional application or a subsequent application. This applies in the same way to technical teachings described in the description which may constitute an invention independent of the features of the independent claims.

According to one aspect, a method for the detection of an object in a spatial region is described, in particular in a vehicle environment. The method comprises, for each of a plurality of cells of the spatial region, determining, based on sensor data relating to the spatial region, a first measured evidence mass for a first hypothesis that a cell is occupied at a current point in time and a second measured evidence mass for a second hypothesis that the cell is not occupied or (at least temporarily) might not be occupied at the current point in time. The method further comprises, for each of the plurality of cells, predicting, based on a first actual evidence mass for the first hypothesis and a second actual evidence mass for the second hypothesis at a previous point in time and based on a plurality of particles for a corresponding plurality of movement hypotheses for the cell, a first predicted evidence mass for the first hypothesis and a second predicted evidence mass for the second hypothesis at the current point in time. The method further comprises, for each of the plurality of cells, determining the first actual evidence mass and the second actual evidence mass at the current point in time by combining the first measured evidence mass and the second measured evidence mass with the first predicted evidence mass and the second predicted evidence mass at the current point in time. The method further comprises determining a position of an object in the spatial region at the current point in time, based on the first actual evidence mass and the second actual evidence mass at the current point in time for the plurality of cells.

With regard to the described procedure, a grid with a large plurality of cells is thus determined, each cell having actual evidence masses for different hypotheses. The actual evidence masses at a current point in time are determined here by prediction based on the actual evidence masses of the previous point in time and on the basis of a particle filter. Furthermore, a fusion and/or an adjustment of the predicted evidence masses with measured evidence masses is carried out. This enables a reliable and robust classification of the spatial region. In particular, the accumulation of the evidence masses measured at different points in time in a grid may reduce and/or avoid information losses due to a temporary masking of a partial region of the spatial region.

According to another aspect, a processing unit is described which is set up to carry out the method described in this document.

According to another aspect, a vehicle, such as a road motor vehicle (m particular a passenger motor vehicle or a commercial motor vehicle or a bus) and/or a mobile robot is described, which includes the processing unit described in this document.

According to another aspect a software (SW) program is described. The SW program may be set up to be executed on a processor (e.g. on a vehicle controller) and thereby execute the method described in this document.

According to another aspect a storage medium is described. The storage medium may include an SW program that is set up to be executed on a processor and thereby to execute the method described in this document.

It should be noted that the methods, devices and systems described in this document may be used alone and also in combination with other methods, devices and systems described in this document. Furthermore, any aspect of the methods, devices and systems described in this document may be combined in a variety of ways. In particular, the features of the claims may be combined in a variety of ways.

BRIEF DESCRIPTION OF THE FIGURES

The invention is further described in detail by means of embodiments, in which.

DETAILED DESCRIPTION

Figure 1:
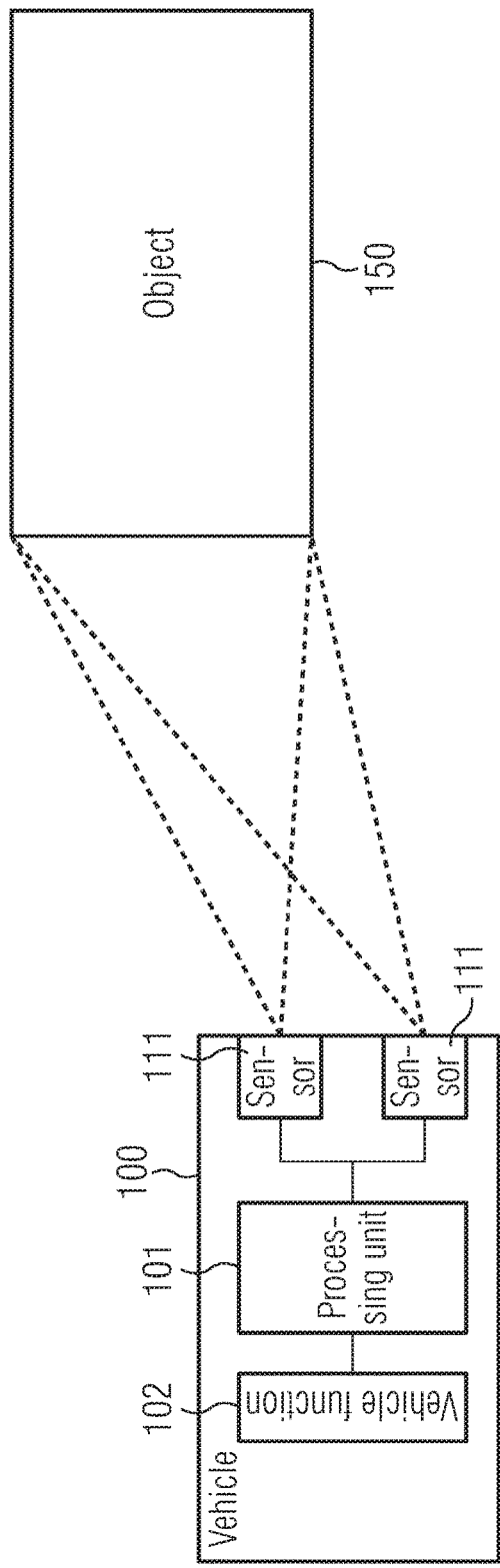
FIG. 1 shows an exemplary vehicle with a plurality of different environment sensors.

As explained at the beginning, the present document deals with the detection and the tracking of at least one object based on sensor data from one or more environment sensors. In this context, FIG. 1 shows a vehicle 100 with one or more environment sensors 111 for the detection of sensor data. The vehicle 100 also includes a processing unit 101, which is set up to detect an object 150 in the environment of vehicle 100 on the basis of the sensor data. A detected object 150 may then be used in a vehicle function 102 (e.g. for partially automated or highly automated driving of the vehicle 100).

The present document deals in particular with the consistent multisensory modelling of the environment of a vehicle 100, which maps static obstacles, drivable regions and/or dynamic objects 150 on different levels of abstraction and estimates the same holistically. The local environment may here be estimated and/or displayed as a Dynamic Occupancy Grid Map and/or grid 200 (see FIG. 2). The dynamics estimation regarding the movement of objects 150 may be done with the help of a particle filter. The measurement data and/or sensor data are accumulated within the map and/or grid 200 and the particulate filter is used (only and/or solely) based on the accumulated data of the grid 200. In this way, the loss of information in a static environment may be prevented in the event of masking. Furthermore, the computational effort may be substantially reduced, since the static environment is directly mapped within a grid 200 without particles. Based on the grid 200, a reliable and precise object tracking is then possible.

Figure 2:
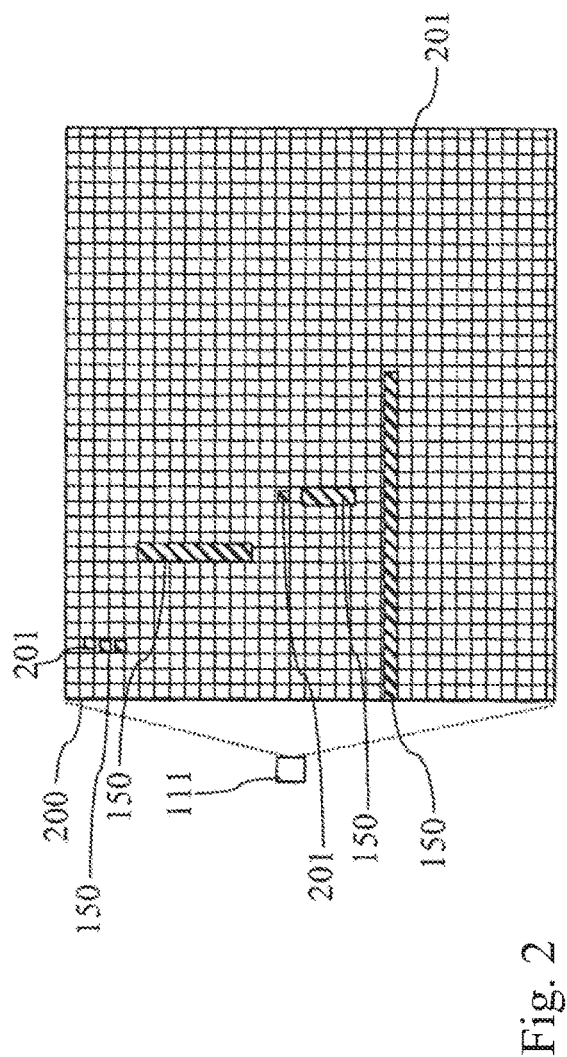
FIG. 2 shows an example of a grid of a vehicle environment.
Figure 3:
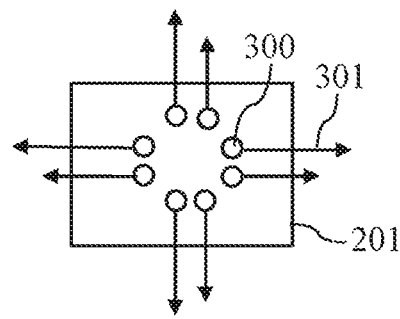
FIG. 3 shows exemplary particles of a cell of a grid.

FIG. 2 shows an exemplary grid 200 of an environment of the vehicle 100 with a plurality of grid cells or in short cells 201. The grid 200 may divide the environment and/or the surrounding of the vehicle 100 into the plurality of two- or three-dimensional cells 201. A two-dimensional cell 201 may have a rectangular shape (for example with an edge length of 10 cm, 5 cm, 2 cm, 1cm or less).

The processing unit 101 may be set up to determine measurement data for one or more of the cells 201 (in particular for each cell 201) on the basis of the sensor data, indicating whether a cell 201 is occupied or not at a certain point in time t. In particular, the measurement data $z_c$ for a cell c 201 may display $$z_c = (m(SD_{z,t}), m(F_{z,t}))$$

where $(SD) = m(\{S, D\})$ is evidence and/or evidence mass that the cell c 201 is occupied by an object 150 that cannot be unambiguously identified as static or dynamic, and where m(F) is evidence that the cell c 201 is free, and therefore not occupied by an object 150 (and therefore a free cell 201). The evidence that the cell 201 is occupied by an object 150 may be considered as object probability and/or as the lower threshold of the object probability that the cell 201 is occupied by an object 150 (especially in the sense of the Dempster-Shafer theory).

Typically, only the evidence and/or evidence masses m(SD), m(F) may be determined on the basis of a temporally isolated measurement at a certain point in time t, since it cannot be determined whether the object is occupied by a static or a dynamic object 150. However, it may be assumed that after a sequence of measurements at a corresponding sequence of points in time at the current point in time t, an occupancy grid $M_t$ 200 may be provided, which shows different evidence for different hypotheses for the different cells 201, $$M_t = \{m(S_t), m(D_t), m(SD_t), m(F_t), m(FD_t)\},$$

where $m(FD_t) = m(\{F, D\}_t))$ indicates the evidence for the hypothesis that a cell 201 not occupied in the past could be occupied by a dynamic object 150 at the point in time t. Furthermore, $m(S_t)$ indicates the evidence and/or evidence mass for the fact that cell c 201 is occupied by a static object 150 at the point in time t. Furthermore, $m(D_t)$ indicates the evidence and/or evidence mass for the fact that the cell c 201 is occupied by a dynamic object 150 at the point in time t. The occupancy grid $M_t$ describes the status and/or the state of the cells 201 of the grid 200 at a certain point in time t. In this document, the evidence and/or evidence masses of the occupancy grid $M_t$ are also referred to as actual evidence masses.

The movement of a possible object 150 may be described by so-called particles. For this purpose, the evidence mass of a cell 201 for the fact that a moving object 150 is present and/or may be present may be divided into a plurality of particles. In particular, at a given point in time t, the evidence mass $m(D_t)$ and/or the evidence mass $m(SD_t)$ may be distributed among a plurality of particles 300. The particles 300 may comprise different movements 301, especially different velocities and/or directions of movement. For example, with a resolution of 360°/R, R different directions of movement and V different velocities may be considered with a certain resolution, so that in a cell 201 R×V different particles 300 are initialized. Thus, when initializing particles 300 for a cell 201, it may be assumed that the object 150, to which the cell 201 belongs, may move arbitrarily.

The occupancy grid $M_t$ and the particles 300 may be used to predict an occupancy grid $M'_t$ for a subsequent point in time. In other words, the (predicted) occupancy grid $M'_t$ for the point in time t may be predicted from the (actual) occupancy grid $M_{t-1}$ and/or the particles 300 for a previous point in time t−1. The following may be assumed for the evidence masses, $$m(S'_t) = m(S_{t-1})$$

$$m(SD'_t) = m(SD_{t-1})$$

$$m(D'_t) = 0$$

$$m(F'_t) = 0$$

$$m(FD'_t) = \frac{m(FD_{t-1}) + m(F_{t-1})}{1 - m(D_{t-1})}$$

The apostrophe (') indicates that it is a (statically) predicted evidence mass. Thus, static aspects may be transferred from $M_{t-1}$ to the point in time t to determine a statically predicted occupancy grid $M'_t$.

The dynamic aspects may be taken into account by means of the particles 300. In particular, for each cell 201, the sum of the evidence masses of the particles 300 which fall into the respective cell 201 at the point in time 1 may each be determined. Based on this, the evidence mass for the fact that a cell 201 is a dynamic object 150 may be determined, e.g.

$$m(\hat{D}_t^c) = \min\left(1 - \varepsilon_o, \sum_{x \in \hat{x}_t^c} o_X\right), \varepsilon_o \in (0, 1)$$

where $\Sigma o_X$ is the sum of the evidence masses of the particles 300, which fall into a determined cell 201. With the mm( ) function it may be guaranteed that the (dynamically) predicted evidence mass $m(\hat{D}_t)$ of a cell c 201 does not become greater than one. This results in a dynamically predicted occupancy grid $\hat{M}_t$.

The dynamically predicted occupancy grid $\hat{M}_t$ and the statically predicted occupancy grid $M'_t$ may be superimposed to determine a predicted occupancy grid $\overline{M}_t$=, e.g. by $$\overline{M}_t=(1-\overline{\in})(\hat{M}_t \oplus M'_t).$$

A temporal uncertainty factor e may be taken into account in the combination.

For compatible hypotheses, the dynamically predicted occupancy grid $\hat{M}_t$ and the statically predicted occupancy grid $M'_t$ may be combined by multiplying the evidence masses. On the other hand, a conflict may be present in case of conflicting hypotheses. This may be the case in particular if for a cell 201, via the dynamic prediction $\hat{M}_t$, an evidence mass $m(\hat{D}_t)$ and, via the static prediction $M'_t$, an evidence mass $m(S_t')$ is predicted. A robust approach for conflict resolution may be to use the actual evidence mass $m(S_{t-1})$ as the predicted evidence mass $m(\overline{S}_t)$ in this case.

Thus, a predicted occupancy grid $\overline{M}_t$ may be determined on the basis of the actual occupancy grid $M_{t-1}$ and the particles 300 for a previous point in time (t−1).

In addition, new measurements are available for the individual cells 201 at the point in time t, which may be summarized in a measured occupancy grid $M_{z,t}$. The measured occupancy grid $M_{z,t}$ may indicate the evidence masses $m(SD_{z,t})$ and $m(F_{z,t})$ for each cell 201. The predicted occupancy grid $\overline{M}_t$ may then be combined with the measured occupancy grid $M_{z,t}$ to determine the actual occupancy grid Mt at the point in time t, i.e.

$$M_t = \overline{M}_t \oplus M_{z,t}$$

The combination of the evidence masses may in turn be executed by multiplying evidence masses for compatible hypotheses. On the other hand, incompatible hypotheses may lead to conflicts. Such a conflict may occur in particular if the current measurement data indicate an evidence mass for a non-occupied cell 201, i.e. $m(F_{z,t})$, while the predicted occupancy grid $\overline{M}_t$ shows evidence masses for a static, a dynamic or a not uniquely static and/or dynamic object 150. The resulting conflict evidence masses $$\zeta(\overline{M}_t, M_{z,t}) = \underbrace{m(\overline{S}_t)m(F_{z,t})}_{\zeta_1} + \underbrace{m(\overline{D}_t)m(F_{z,t})}_{\zeta_2} + \underbrace{m(\overline{SD}_t)m(F_{z,t})}_{\zeta_3}$$

may e.g. be allocated to the different hypotheses as follows, $$m(S_t) \leftarrow \tfrac{1}{2}\zeta_1,$$

$$m(F_t) \leftarrow \tfrac{1}{2}\zeta_1 + \zeta_2 + \zeta_3,$$

When determining a measured occupancy grid $M_{z,t}$, typically no evidence mass is determined for the hypotheses "static object" and/or "dynamic object", but only the evidence mass $m(SD_{z,t})$ for the fact that a cell 201 is occupied by an object 150 not specified in more detail. As a result, combining the predicted occupancy grid $\overline{M}_t$ with the measured occupancy grid $M_{z,t}$ would only increase the evidence mass for the hypothesis SD, but not the evidence mass for the hypotheses S and/or D.

To increase the accuracy of an occupancy grid $M_t$ at the point in time t, the evidence mass for the hypothesis SD may be divided, i.e.

$$m(SD | \overline{M}_t \oplus_c M_{z,t}) = \underbrace{m(\overline{SD}_t)m(\Theta_{z,t})}_{\lambda_1} + \underbrace{m(\overline{SD}_t)m(SD_{z,t})}_{\lambda_2} + \underbrace{m(\Theta_t)m(SD_{z,t})}_{\lambda_3}$$

to the hypotheses SD, S and D. Here, $m(SD|\overline{M}_t \oplus_c M_{z,t})$ may describe the Dempster-Shafer evidence combination, in this case for the hypothesis SD, given the predicted occupancy grid $\overline{M}_t$ and the measured occupancy grid $M_{z,t}$ without standardization and/or consideration of conflicts. In other words, $m(SD|\overline{M}_t \oplus_c M_{z,t})$ may describe the multiplication of the evidence masses of the hypotheses whose intersection corresponds to the described hypothesis, in this case the hypothesis SD with the associated combined set {S, D} from the hypotheses of a static object S or a dynamic object D. The division may be done as follows, $$m(SD_t) \leftarrow \lambda_1$$

$$m(S_t) \leftarrow \lambda_2$$

$$m(D_t) \leftarrow f_D \lambda_3,$$

$$m(SD_t) \leftarrow (1-f_D)\lambda_3$$

where $f_D$ is a positive number less than one, which may depend on the number of particles 300 in the cell 201 under consideration. As an alternative or in addition, $f_D$ may depend on the measured value of the radial velocity of the cell 201 under consideration, whereby the measured value may be detected e.g. by a radar sensor 111. Thereby $f_D$ may increase with increasing speed. As an alternative or in addition, $f_D$ may be selected depending on information from classification algorithms, e.g. based on image sensors. As an alternative or in addition, $f_D$ may depend on a superordinate object tracking of extended objects, which may be extended across several adjacent cells 201, where $f_D$ may increase near expected and/or predicted extended objects.

On the other hand, evidence mass that would be allocated when combining the hypothesis for a dynamic object 150 may be at least partially redistributed to the hypothesis SD in order to take into account measurement errors or erroneous simplifications of the measurement models of the respective sensors. For the evidence mass for the hypothesis D the following results $$m(D | \overline{M}_t \oplus_c M_{z,t}) = m(\overline{D}_t)(1 - m(F_{z,t})) + \underbrace{m(\overline{FD}_t)m(SD_{z,t})}_{\lambda_4}$$

The corresponding term $\lambda_4$, which represents the combination of the predicted evidence mass $m(\overline{FD}_t)$ of the FD hypothesis, i.e. the hypothesis that the cell 201 is free or dynamically occupied, and the measured evidence mass $m(SD_{z,t})$ of the SD hypothesis for an occupation that is not further classified, may be redistributed as follows $$m(D_t) \leftarrow (1-\gamma)\lambda_4 + f_D \gamma \lambda_4,$$

$$m(SD_t) - (1-f_D)\gamma\lambda_4,$$

where $\gamma$ is a design parameter between 0 and 1.

The resulting evidence masses of the actual occupancy grid $M_t$ at the point in time t thus result to be $$m(S_t) = m(S|\overline{M}_t \oplus_c M_{z,t}) + \tfrac{1}{2}\zeta_1 + \lambda_2,$$

$$m(D_t) = m(D|\overline{M}_t \oplus_c M_{z,t}) - (1-f_D)\gamma\lambda_4 + f_D \lambda_3,$$

$$m(SD_t) = m(SD|\overline{M}_t \oplus_c M_{z,t}) - \lambda_2 - f_D \lambda_3 + (1 f_D)\gamma\lambda_4,$$

$$m(F_t) = m(F|\overline{M}_t \oplus_c M_{z,t}) + \tfrac{1}{2}\zeta_1 + \zeta_2 + \zeta_3,$$

$$m(FD_t) = m(FD|\overline{M}_t \oplus_c M_{z,t}).$$

In addition to determining an actual occupancy grid $M_t$ for the point in time t, the distribution of the particles 300 may be updated to generate an up-to-date image of the dynamic aspects, especially the direction of movement of one or more objects 150, of an environment. For this purpose, the evidence mass for the hypothesis of a dynamic object 150, i.e. $m(D_t)$, may be distributed across a plurality of particles 300. The number of particles 300 for a cell 201 may be proportional to the evidence mass $m(D_t)$ of the cell 201.

For example, the density of particles 300 for a cell 201 may e.g. be selected as $$\rho^c = m(D_t^c) + (1-f_D)(\lambda_3 + \gamma \lambda_4)$$

and may thus be selected depending on the evidence mass for a dynamic object D and depending on an evidence mass $m(SD)$ increased by the current measurement $M_{z,t}$, which may possibly correspond to a dynamic object. In addition, the evidence mass for a static object S may also be considered, wherein a higher evidence mass $m(S_t)$ reduces the density of particles 300, since the particles 300 correspond to the hypotheses of dynamic objects. The density may be multiplied by a maximum value of particles 300 for a cell 201 to determine the adaptive number of particles 300 for a cell 201. As an alternative, the number of particles in a cell may be selected independently of the evidence masses and defined e.g. to a constant fixed value. Of the available particles 300 at least a part may be derived from the predicted particles 300 of the previous point in time (t−1), which were predicted into the respective cell 201. This allows filtering along the direction of movement of an object 150. Furthermore, a (relatively low) number of randomly distributed new particles 300 may be generated. This may increase the robustness of the iterative method for updating an actual occupancy grid $M_t$. The total dynamic evidence mass $m(D_t)$ of a cell 201 may be evenly distributed across the total number of particles 300 of the cell 201, so that the sum of the evidence masses $\Sigma o_X$ of all particles 300 of the cell 201 corresponds to the dynamic evidence mass $m(D_t)$ of this cell 201. The updated particles 300 may then in turn be used to determine a dynamically predicted occupancy grid $\hat{M}_{t+1}$ for a subsequent point in time t+1.

Figure 5:
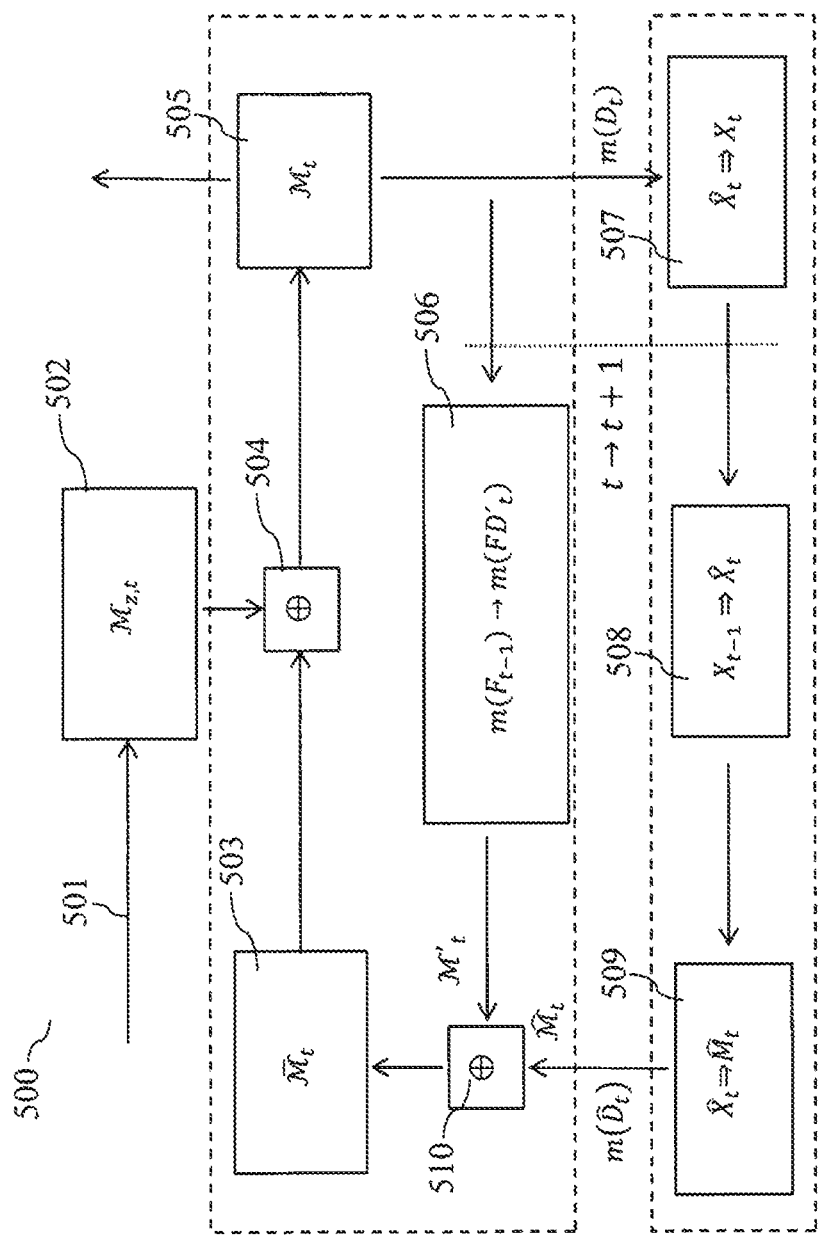
FIG. 5 shows a flow chart of an exemplary method for determining an occupancy grid for a spatial region.

FIG. 5 illustrates an iterative method 500 for updating an (actual) occupancy grid $M_t$ 505 (which for each cell 201 of the grid 200 comprises actual evidence masses $m(S_t)$, $m(D_t)$, $m(SD_t)$, $m(F_t)$, $m(FD_t)$) on the basis of sensor data 501 from one or more environment sensors 111. The method 500 may be repeated for a sequence of points in time t−1, t, t+1, t+2, . . . , e.g. with a repetition rate and/or sampling frequency of 1 Hz, 10 Hz, 100 Hz or more. At a current point in time t, a measured occupancy grid $M_{z,t}$ 502 (which comprises measured evidence masses $m(SD_{z,t})$, $m(F_{z,t})$ for each cell 201 of the grid 200) may be determined on the basis of sensor data 501. The measured occupancy grid $M_{z,t}$ 502 may be combined 504 with a predicted occupancy grid $\overline{M}_t$ 503. The predicted occupancy grid $\overline{M}_t$ 503 may be determined by combining 510 a statically predicted occupancy grid $M'_t$ and a dynamically predicted occupancy grid $\hat{M}_t$. The statically predicted occupancy grid $M'_t$ may be predicted and/or determined by a mapping process 506 from the (actual) occupancy grid $M_{t-1}$ 505 of the previous point in time (t−1). The dynamically predicted occupancy grid $\hat{M}_t$ may be determined by a particle tracking process from the actual D evidence mass $m(D_{t-1})$ of the individual cells 201 at the previous point in time (t−1). The particle tracking process may include a resampling step 507, in which the actual D evidence mass $m(D_{t-1})$ of a cell 201 is distributed to old and/or new particles 300. Based on the movement 301 of these particles 300, a movement and/or distribution of the particle evidence mass within the grid 200 may then be predicted 508 to the current point in time t. From the distribution of the particle evidence mass at the current point in time t the dynamically predicted D evidence mass ($m(\hat{D}_t)$) of the individual cells 201 may be determined 509 (e.g. based on the sum of the particle evidence mass in the respective cell 201).

Figure 4:
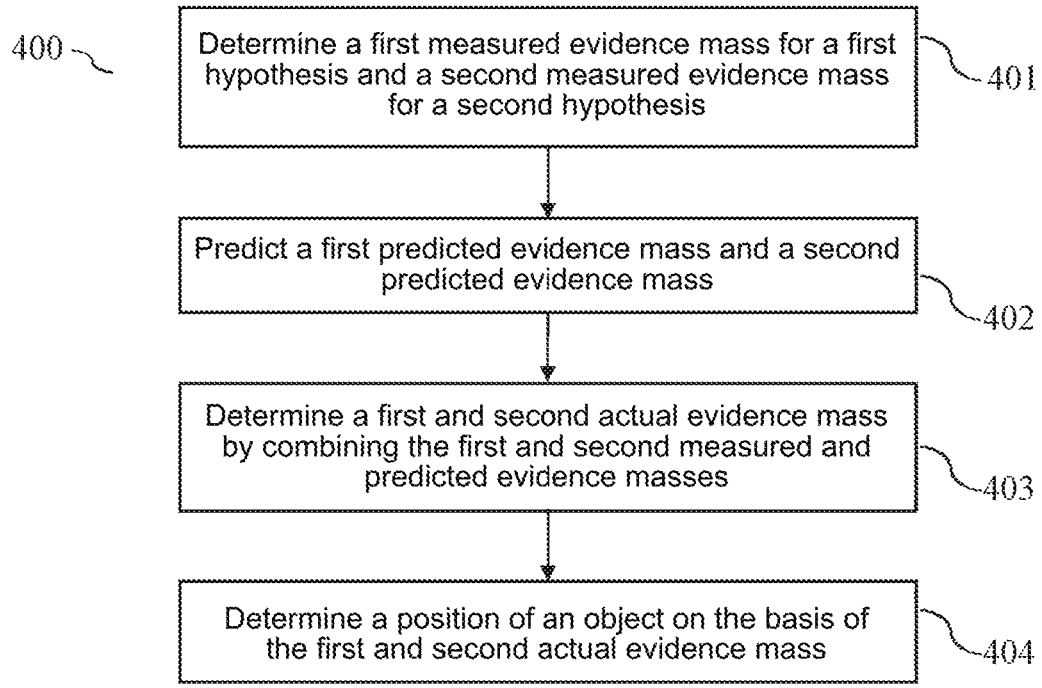
FIG. 4 shows a flow chart of an exemplary method for the detection of an object.

FIG. 4 shows a flow chart of an exemplary method for detecting an object 150 in a spatial region. The spatial region may be e.g. the environment and/or the surroundings of a vehicle 100. The spatial region may be divided into a grid 200 with a plurality of cells 201. The method 400 may be carried out by an evaluation unit 101, in particular of a vehicle 100.

The method 400 comprises, for a cell 201 (m particular for each cell 201) of the plurality of cells 201 of the spatial region, determining 401, based on sensor data relating to the spatial region, a first measured evidence mass, e.g. $m(SD_{z,t})$, for a first hypothesis, e.g. the SD hypothesis, that the cell 201 is occupied at a current point in time t. Furthermore, based on the sensor data, a second measured evidence mass, e.g. $m(F_{z,t})$, may be determined for a second hypothesis, e.g. for the F hypothesis that the cell 201 is not or may not be occupied at the current point in time t.

The sensor data may be detected using one or more environment sensors 111. Here, with a certain temporal sampling rate (e.g. 1 Hz, 10 Hz, 100 Hz or more) measured values may be detected. Thus, sensor data may each be provided at a sequence of points in time. The method 400 may be repeated iteratively for the sequence of points in time. The first measured evidence mass and the second measured evidence mass may each be determined in isolation on the basis of the sensor data of a respective point in time. Typically, on the basis of such a temporally isolated measurement, it may only be determined whether a cell 201 is free (F hypothesis) or occupied (SD hypothesis). In most cases, it is not possible to determine whether the cell 201 is occupied by a static object 150 or by a dynamic object 150. By measurements at the current point in time t, the evidence masses $m(SD_{z,t})$ and $(F_{z,t})$ may be determined. To determine the evidence masses, a fusion of sensor data from different types of environment sensors 111 may be carried out.

In general, the first evidence mass for the first hypotheses may include an S evidence mass $m(S)$ for a "statically occupied", in short S, hypothesis that the cell 201 is occupied by a static object 150. As an alternative or in addition, the first evidence mass for the first hypothesis may include a D evidence mass $m(D)$ for a "dynamically occupied", in short D, hypothesis that the cell 201 is occupied by a moving, dynamic object 150. As an alternative or in addition, the first evidence mass for the first hypothesis may include an SD evidence mass $m(SD)$ for an "unknown occupied", in short SD, hypothesis that the cell 201 is occupied by an object 150 of which it is not known whether it is static or dynamic.

In general, the second evidence mass for the second hypothesis may include an F evidence mass $m(F)$ for a "free", or in short F, hypothesis that there is no object 150 in the cell 201. As an alternative or in addition, the second evidence mass for the second hypothesis may include an FD evidence mass $m(FD)$ for a "transitorily free", in short FD, hypothesis that the cell 201 is not occupied or only temporarily occupied by a dynamic object 150. The FD hypothesis may apply, for example, if a cell 201, which was previously free, is masked by an object 150, and thus it cannot be determined unambiguously whether the cell 201 is free or occupied by a dynamic object 150.

In particular, the state of a cell 201 at a given point in time t may be described by the actual S evidence mass $m(S_t)$, the actual D evidence mass $m(D_t)$, the actual SD evidence mass $m(SD_t)$, the actual F evidence mass $m(F_t)$ and/or the actual FD evidence mass $m(\overline{FD}_t)$. Thereby, the individual evidence masses are typically normalized to values between 0 and 1. Furthermore, the evidence masses are typically defined in such a way that the sum of the evidence masses for the different hypotheses is less than or equal to one. The remaining evidence mass may be referred to as the residual evidence mass $m(\Theta_t)$, and may indicate the evidence mass that is not or may not be allocated to any of the hypotheses, e.g. the superior set $\Theta = \{S, D, F\}$. The individual evidence masses may indicate the probability that the corresponding hypothesis applies to the cell 201. The evidence masses may be based on the evidence theory of Dempster-Shafer.

Furthermore, the method 400 comprises predicting 402 a first predicted evidence mass $m(\overline{SD}_t)$, $m(\overline{S}_t)$ and/or $m(\overline{D}_t)$, for example, for the first hypothesis, for example the SD hypothesis, the S hypothesis and/or the D hypothesis, and a second predicted evidence mass $m(\overline{F}_t)$ and/or $m(\overline{FD}_t)$, for example, for the second hypothesis, e.g. the F hypothesis and/or the FD hypothesis, at and/or to the current point in time t.

The first and second predicted evidence masses at the current point in time t may here be predicted based on the actual evidence mass, e.g. $m(SD_{t-1})$, $m(S_{t-1})$ and/or $m(D_{t-1})$, for the first hypothesis, e.g. for the SD hypothesis, the S hypothesis and/or D hypothesis, and on the basis of the second actual evidence mass, e.g. $m(F_{t-1})$ and/or $m(FD_{t-1})$, for the second hypothesis, e.g. for the F hypothesis and/or for the FD hypothesis, at a previous point in time (t−1).

Furthermore, a plurality of particles 300 for a corresponding plurality of movement hypotheses for the cell 201 may be considered when predicting 402 the first and second predicted evidence masses. A movement hypothesis may here be a hypothesis regarding the direction of movement and/or the speed of movement of the cell 201.

The dynamic behavior of the cells 201 may be described by the particles 300. For example, at the preceding point in time (t−1), the first actual evidence mass, in particular $m(D_{t-1})$, of the individual cells 201 may each have been divided up to several particles 300, wherein the individual particles 300 may at least partially comprise different movements 301, in particular directions of movement and/or speeds of movement (for different movement hypotheses). The particles 300 may have moved in the period of time between the previous point in time (t−1) and the current point in time t according to the respectively defined movement 301. At least a part of the particles 201 of the plurality of cells 201 may then be located in a particular cell 201 at the current point in time t. The large number of particles 300 used to predict 402 of the first and second predicted evidence masses of the particular cell 201 may be the particles 300 defined at the previous point in time (t−1) and which, due to their movement 301, fall into the specified cell 201 at the current point in time t.

For predicting 402 the first and second predicted evidence masses, the actual evidence masses from the previous point in time (t−1) and particles 300 may thus be taken into account, wherein the dynamic aspects of the spatial region are described by the particles 300.

Furthermore, the method 400 comprises determining 403 the first actual evidence mass (e.g. $m(SD_t)$, $m(S_t)$ and/or $m(D_t)$) and the second actual evidence mass (e.g. $m(F_t)$ and/or $m(FD_t)$) at the current point in time (t) by combining 504 the first measured evidence mass (e.g. $m(SD_{z,t})$) and the second measured evidence mass (e.g. $m(F_{z,t})$) at the current point in time t on the one hand with the first predicted evidence mass (e.g. $m(\overline{SD}_t)$, $m(\overline{S}_t)$ and/or $m(\overline{D}_t)$) and the second predicted evidence mass (e.g. $m(\overline{F}_t)$ and/or $m(\overline{FD}_t)$) at the current point in time t on the other hand.

Combining evidence masses may include multiplying the evidence masses. In particular, the first measured evidence mass may be multiplied by the first predicted evidence mass, the first measured evidence mass by the second predicted evidence mass, the second measured evidence mass by the first predicted evidence mass, and the second measured evidence mass by the second predicted evidence mass, in order to combine the evidence masses from the prediction with the evidence masses from the measurement. The thus combined evidence masses may then be allocated to the first and/or second actual evidence mass to determine the current state of a cell 201.

In the context of combining evidence masses, conflicts may arise with regard to the allocation of combined evidence masses.

In particular, the method 400 may include the determination of conflict evidence masses for a combination of hypotheses that contradict each other. The conflict evidence masses may then be allocated to the first and/or second hypothesis according to certain rules. This may enable a robust determination of actual evidence masses.

By means of acts 401, 402, 403 of the method 400, the state of the individual cells 201 of a grid 200 may be determined in a reliable and robust manner for a spatial region at a sequence of points in time t. For this purpose, the method 400 may be repeated iteratively for successive points in time. Thereby, dynamic activities in the spatial region may be considered within the framework of the method 400 by considering particles 300 for the transition between different points in time. Furthermore, by taking into account specific S evidence masses for static objects 150, the information relating to such static objects 150 may be retained even if they are masked. In addition, the consideration of an FD evidence mass makes it possible to prevent a loss of information due to masking.

The method 400 may further include determining 404 a position of an object 150 in the spatial region at the current point in time t, based on the first actual evidence mass (e.g. $m(SD_t)$, $m(S_t)$ and/or $m(D_t)$) and the second actual evidence mass (e.g. $m(F_t)$ and/or $m(FD_t)$) at the current point in time t for the plurality of cells 201. In particular, by taking into account the actual evidence masses at a sequence of successive points in time, a reliable, precise and robust tracking of an object 150 may be performed.

Within the scope of predicting 402 an actual evidence mass at the current point in time t, on the basis of the first actual evidence mass (e.g. $m(SD_{t-1})$, $m(S_{t-1})$ and/or $m(D_{t-1})$ and/or from the previous point in time (t−1), a first statically predicted evidence mass (e.g. $m(SD'_t)$, $m(S'_t)$ and/or $m(D'_t)$) may be predicted at the current point in time t (e.g. by means of a mapping process 506). The first statically predicted evidence mass may be predicted from the previous actual evidence mass (without taking into account the dynamic evidence mass and/or the particles 300) and/or be based on a static prediction. Furthermore, based on the plurality of particles 300, a first dynamically predicted evidence mass (e.g. $m(\hat{D}_t)$) may be determined at the current point in time t (e.g. by means of a particle tracking process 507, 508, 509). A particle 300 may be allocated to a particle evidence mass, and determining the first dynamically predicted evidence mass (e.g. $m(\hat{D}_t)$) may include summing up the particle evidence masses of the plurality of particles 300 in the cell 201.

Thus, predicting 402 may be performed separately for static and for dynamic aspects. Thus, a loss of information of static aspects within the prediction from a previous point in time to a current point in time may be prevented and/or reduced. The first predicted evidence mass (e.g. $m(\overline{SD}_t)$, $m(\overline{S}_t)$ and/or $m(\overline{D}_t)$) for the first hypothesis (e.g. the SD hypothesis, the S hypothesis and/or the D hypothesis) may then be determined by combining 510 the first statically predicted evidence mass (e.g. m(SD't), $m(S'_t)$ and/or $m(D'_t)$) and the first dynamically predicted evidence mass (e.g. $m(\hat{D}_t)$).

After determining the current state of a cell 201, an update of the particles 300 may be performed to take dynamic aspects into account. The first actual evidence mass (e.g. $m(SD_t)$ and/or $m(D_t)$) of the cell 201 at the current point in time t may be distributed across a plurality of updated particles 300. In particular, an even distribution of the first actual evidence mass, e.g. of $m(D_t)$, to the different particles 300 of a cell 201 may take place.

The plurality of updated particles 300 of the cell 201 may at least partially include particles 300 of the previous point in time (t−1) falling into the cell 201 at the current point in time t. In this way, dominant movements may be filtered out and/or identified.

As an alternative or in addition, the plurality of updated particles 300 may at least partially comprise new particles 300 with different movements 301 (e.g. different directions of movement and/or speeds of movement). In this way, a uniform coverage of possible movements 301 may take place. This allows new movements of new objects 150 and/or changes in the direction of movement to be taken into account.

The method 400 may include determining a statically predicted S evidence mass $m(S'_t)$ at the current point in time t on the basis of the actual S evidence mass $m(S_{t-1})$ at the previous point in time (t−1) (e.g. by means of a mapping process 506). In particular, $m(S'_t)=m(S_{t-1})$ may be set. Furthermore, method 400 may include the determination of a dynamically predicted D evidence mass ($m(\hat{D}_t)$) based on the sum of particle evidence masses of the plurality of particles 300 falling into and/or leading to cell 201 at the current point in time t (e.g. based on a particle tracking process 507, 508, 509). A conflict evidence mass may then be determined on the basis of the statically predicted S evidence mass $m(S'_t)$ and the dynamically predicted D evidence mass ($m(\hat{D}_t)$), e.g. by multiplying the statically predicted S evidence mass $m(S'_t)$ and the dynamically predicted D evidence mass ($m(\hat{D}_t)$). The conflict evidence mass may then at least partially or completely be allocated to the predicted S evidence mass $m(\hat{S}_t)$ at the current point in time t. Thus, a robust determination of the state of a cell 201 may be caused.

The method 400 may include determining a statically predicted FD evidence mass $m(FD'_t)$ at the current point in time t on the basis of the actual FD evidence mass $m(FD_{t-1})$, on the basis of the actual F evidence mass ($m(F_{t-1})$) and on the basis of the actual D evidence mass ($m(D_{t-1})$) at the previous point in time (t−1). The statically predicted FD evidence mass $m(FD'_t)$ may in particular be determined as $$m(FD't) = \frac{m(FD_{t-1}) + m(F_{t-1})}{1 - m(D_{t-1})}.$$

Thus, it may be caused that even after a dynamic object 150 has left a cell 201, there is still an indication that the cell 201 may be occupied by a dynamic object 150 (especially if the F hypothesis has not yet been confirmed by a concrete measurement of sensor data). The denominator of the above formula may be used to ensure that a cell that was measured as free and is occupied by a dynamic object 150 for a short period of time at a later point in time (which may take place purely on the basis of a prediction of the particles 300 without an associated occupancy measurement, if necessary), will at a later point in time again receive approximately the previous value of the FD evidence mass from the original F measurement. As a result, there remains an indication that this cell is accessible. This is typically not derived directly from the D evidence mass, but only from the measured F evidence mass.

The predicted FD evidence mass $m(\overline{FD}_t)$ at the current point in time t may then be determined based on the statically predicted FD evidence mass $m(FD'_t)$ at the current point in time t. This enables a robust and reliable estimation of a free space in the spatial region (even in case of a temporary masking or occupancy by a dynamic object 150).

As already explained above, the method 400 may include determining a statically predicted S evidence mass $m(S'_t)$ at the current point in time t on the basis of the actual S evidence mass $m(S_{t-1})$ at the previous point in time (t−1). Further, the method 400 may include determining a statically predicted SD evidence mass $m(SD'_t)$ at the current point in time t on the basis of the actual SD evidence mass $m(SD_{t-1})$ at the previous point in time (t−1), in particular as $m(SD'_t)=m(SD_{t-1})$. Further, as already indicated above, a statically predicted FD evidence mass $m(FD'_t)$ at the current point in time t on the basis of the actual FD evidence mass $m(FD_{t-1})$, on the basis of the actual F evidence mass $m(F_{t-1})$ and on the basis of the actual D evidence mass ($m(D_{t-1})$ at the previous point in time (t−1) may be determined. In addition, as explained above, the method 400 may include the determination of a dynamically predicted D evidence mass ($m(\hat{D}_t)$) based on the sum of particle evidence masses of the plurality of particles 300.

For predicting the first and/or second predicted evidence mass, the statically predicted S evidence mass $m(S'_t)$, the statically predicted SD evidence mass m(SD't) and/or the statically predicted FD evidence mass $m(FD'_t)$ on the one hand may be combined with the dynamically predicted D evidence mass ($m(\hat{D}_t)$) on the other hand (e.g. by multiplication in pairs). Thus, both static and dynamic aspects may be transferred in a robust and reliable way from the previous point in time (t−1) to the current state t. The conflicts that arise may be resolved as described below.

The method 400 may include to determine conflict evidence masses between the predicted S evidence mass $m(\overline{S}_t)$, the predicted D-evidence mass $m(\overline{D}_t)$ and/or the predicted SD evidence mass $m(\overline{SD}_t)$ at the current point in time t on the one hand and the measured F evidence mass $m(F_{z,t})$ at the current point in time t on the other hand. The conflict evidence masses may be determined in particular as $$\zeta(\overline{M}_t, M_{z,t}) = \underbrace{m(\overline{S}_t)m(F_{z,t})}_{\zeta_1} + \underbrace{m(\overline{D}_t)m(F_{z,t})}_{\zeta_2} + \underbrace{m(\overline{SD}_t)m(F_{z,t})}_{\zeta_3}$$

Further, the method 400 may include allocating the conflict evidence masses to the actual S evidence mass $m(S_t)$ and/or to the actual F evidence mass $m(F_t)$ at the current point in time t. The allocation may in particular be executed in accordance with $$m(S_t) \leftarrow \frac{1}{2}\zeta_1,$$

$$m(F_t) \leftarrow \frac{1}{2}\zeta_1 + \zeta_2 + \zeta_3,$$

This allows causing a reliable and fast update of the available free space in the spatial region based on the current sensor data.

The method 400 may include the determination of a non-classified evidence mass for occupancy or an actual SD evidence mass, based on the predicted SD evidence mass $m(\overline{SD}_t)$ and the measured SD evidence mass $m(SD_{z,t})$ at the current point in time t. The non-classified evidence mass for occupancy may be determined, in particular, on the basis of and/or as $\lambda_2 = m(\overline{SD}_t)m(SD_{z,t})$ The non-classified evidence mass for occupancy may then at least partially be allocated to the actual S evidence mass $m(S_t)$ and/or the actual D evidence mass $m(D_t)$ at the current point in time t.

In particular, an allocation $m(S_t) \leftarrow \lambda_2$ may be made to achieve convergence to a static object 150 in the case of several measured SD evidence masses $m(SD_{z,t})$ at several points in time through the resulting accumulation of occupancy within the same cell 201. Thus, it may be affected, that the measured SD evidence mass $m(SD_{z,t})$ is divided into S and/or D evidence mass to enable the detection and classification of static and/or dynamic objects 150.

The method 400 may include determining a measured residual evidence mass $m(\Theta_{z,t})$ at the current point in time t based on the sum of the first measured evidence mass $m(SD_{z,t})$ and the second measured evidence mass $m(F_{z,t})$. In particular, the measured residual evidence mass $m(\Theta_{z,t})$ may be determined in such a way that the sum of all measured evidence masses (mcluding the measured residual evidence mass $m(\Theta_{z,t})$) equals one. In a corresponding manner, method 400 may include the determination of a predicted residual evidence mass $m(\overline{\Theta}_t)$ at the current point in time t based on the sum of the first predicted evidence mass (e.g. $m(\overline{SD}_t)$, $m(\overline{S}_t)$ and/or $m(\overline{D}_t)$) and the second predicted evidence mass (e.g. $m(\overline{F}_t)$ and/or $m(\overline{FD}_t)$). In particular, the predicted residual evidence mass $m(\Theta_{z,t})$ may be determined in such a way that the sum of all predicted evidence masses (including the predicted residual evidence mass) equals one.

Based on the measured residual evidence mass $m(\Theta_{z,t})$, the predicted residual evidence mass $m(\overline{\Theta}_t)$, the predicted SD evidence mass $m(\overline{SD}_t)$ and the measured SD evidence mass $m(SD_{z,t})$ at the current point in time t, a non-classified evidence mass for occupancy may then be determined. In particular, $\lambda_1 = m(\overline{SD}_t)m(\Theta_{z,t})$ and/or $\lambda_3 = m(\overline{\Theta}_t)m(SD_{z,t})$ may be determined as non-classified evidence masses for occupancy.

The non-classified evidence mass for occupancy may then be at least partially allocated to the actual S evidence mass $m(S_t)$, the actual D evidence mass $m(D_t)$ and/or the actual SD evidence mass $m(SD_t)$ at the current point in time t. This may be done in particular on the basis of: $m(SD_t) \leftarrow \lambda_1$, $m(D_t) \leftarrow f_D \lambda_3$ and/or $m(SD_t) \leftarrow (1-f_D)\lambda_3$; wherein $f_D$ is a distribution factor. Thus, in combination with the allocation of $\lambda_2$, an occupied cell 201 may be caused to converge reliably to a statically occupied cell 201 if measurements repeatedly indicate an occupancy. Furthermore, this may be used to ensure that newly occupied cells 201 may (initially) be regarded as dynamically occupied cells 201. This enables a reliable and robust detection of static and dynamic objects 150.

The distribution factor $f_D$ may depend on the number and/or density of particles 300 in the cell 201. Typically, $f_D$ increases with an increasing number and/or density. As an alternative or in addition, the distribution factor $f_D$ may depend on sensor data in relation to a speed of movement of the cell 201 (e.g. in a direction of movement radial with respect to the measuring environment sensor 111). The sensor data may be provided by a radar sensor, for example. The distribution factor $f_D$ may increase with increasing speed of movement and/or be dimensioned as described in this document. For example, the distribution factor may depend on information from an object tracking and/or classification algorithm. Thus, the accuracy of the distribution between the actual S evidence mass $m(S_t)$ and the actual D evidence mass $m(D_t)$ may be further improved, which leads to an increased accuracy of the detection of static and dynamic objects 150.

The method 400 may include the determination of a possible dynamic evidence mass. The possible dynamic evidence mass may be calculated on the basis of the predicted FD evidence mass $m(\overline{FD}_t)$ and on the basis of the measured SD evidence mass $m(SD_{z,t})$ at the current point in time t, in particular on the basis of and/or as $\lambda_4 = m(\overline{FD}_t)m(SD_{z,t})$. The possible dynamic evidence mass may at least partially be allocated to the actual SD evidence mass $m(SD_t)$ and/or the actual D evidence mass $m(D_t)$ at the current point in time t. The allocation may in particular be executed on the basis of or according to $m(D_t) \leftarrow (1-\gamma)\lambda_4 + f_D\gamma\lambda_4$ and/or $m(SD_t) \leftarrow (1-f_D)\gamma\lambda_4$, wherein $\gamma$ is a variable parameter between 0 and 1. Thus, it may be taken into account that a temporarily occupied cell 201 is typically occupied by a dynamic object 150. Thus, the robustness and the quality of the detection of an object 150 may be further increased.

Thus, at a current point in time t, the state of a plurality of cells 201 of a grid 200 of the environment (e.g. of a vehicle 100) may be determined on the basis of sensor data from one or more environment sensors 111 (e.g. of the vehicle 100). The environment and/or spatial region may be divided into a two-dimensional (2D) grid 200 with grid cells 201, wherein one grid cell 201 may have a size of e.g. 10 cm×10 cm or 20 cm×20 cm.

The state may include the above-mentioned actual evidence masses at the current point in time t. These evidence masses for a cell 201 may indicate an object probability that the cell 201 is occupied by a (static and/or dynamic) object. The object probability may here depend on the evidence and/or evidence masses $m(S_t)$, $m(D_t)$ and/or $m(SD_t)$. Furthermore, a cell velocity $v_c$ of a cell 201 may be determined on the basis of the particles 300 of the cell 201. The cell velocity may here, for example, comprise an amount and a direction of movement and/or velocity components in a Cartesian coordinate system. In a corresponding way, the state for several (in particular all) cells 201 of the grid 200 may be described by the corresponding evidence masses and/or cell velocities.

The one or more environment sensors 111 may include, for example, one or more radar sensors, one or more ultrasonic sensors, one or more LIDAR sensors, one or more image sensors, etc. The sensor data of several environment sensors 111 may be superimposed and/or combined to determine the state of the cells 201 of the grid 200 on the basis of the method 400.

The method 400 may include determining an occupancy probability for a particular cell 201 to be occupied by an object 150, wherein the object 150 was already detected at the previous point in time (t−1). The occupancy probability (possibly alone) is here determined on the basis of a state of object 150 at the previous point in time (t−1). In particular, when determining the occupancy probability, the actual evidence masses of the cells 201 of the grid 200 for the current point in time t may be disregarded.

Based on the sensor data for the cells 201 of the grid 200 at the previous point in time (t−1), the state of the cells 201 of the object 150 at the previous point in time (t−1) may have been determined. From the state of the cells 201 of the object 150, in turn the state of the object 150 may have been determined. For example, the state of an object 150 may be described by one or more of the following state parameters: the position $(x_\tau, y_\tau)$ of a reference point of the object 150; the amount of object velocity $v_\tau$; the orientation $\Phi_\tau$ of the object 150; the width $w_\tau$ and the length $l_\tau$ of the (extended) object 150 (e.g. the width $w_\tau$ and the length $l_\tau$ of a box model of the object 150); the acceleration $\alpha_\tau$ of the object 150; and/or the rotation rate $\omega_\tau$ of the object 150.

The state of the object 150 at the previous point in time (t−1) may be used to predict which cells 201 of the grid 200 are occupied by the object 150 at the current point in time t. In other words, it is possible to determine the occupancy probability of the object 150 occupying a certain cell 201. The occupancy probability of the cells 201 of the grid 200 by a specific object 150 may be determined for several cells 201 (if necessary, for all cells 201) of the grid 200.

The method 400 may then include allocating a cell 201 to a particular object 150, depending on the object probability (and/or depending on the first actual evidence mass) and depending on the occupancy probability. In particular, a cell 201 may be allocated to an object 150 if the object probability and/or the first actual evidence mass indicates a relatively high probability that the cell 201 is occupied by an object 150 (in general), and if the occupancy probability indicates a relatively high probability that the cell 201 is occupied by a specific object 150.

By taking into account the state of one or more previously detected objects 150, the detection of free spaces and/or the detection of (dynamic and/or static) objects 150 in a spatial region, especially in the environment of a vehicle 100, may be improved.

The method 400 may further include operating a function of a vehicle 100 based on the first actual evidence mass (e.g. $m(SD_t)$, $m(S_t)$ and/or $m(D_t)$) and/or based on the second actual evidence mass (e.g. $m(F_t)$ and/or $m(FD_t)$) at the current point in time t. As an alternative or in addition, a function of a vehicle 100 may be operated depending on the detected object 150, in particular depending on the determined position of the object 150. The function of the vehicle 100 may, for example, include a function to perform, at least partially automatically, a longitudinal and/or lateral guidance of the vehicle 100. In particular, the function may include partially, highly or fully automated driving of a vehicle. The method 400 described in this document makes it possible to improve the availability and reliability of an automated driving function of a vehicle 100 by improving the detection of the environment of the vehicle 100. Furthermore, the computing effort may be reduced at the same time (by a significantly reduced number of required particles 300).

The present invention is not restricted to the illustrated embodiments. In particular, it should be noted that the description and figures are only intended to illustrate the principle of the proposed methods, devices and systems.

The invention claimed is:

1. A method of detecting an object in a spatial region, the method comprising:
   detecting sensor data relating to the spatial region with one or more environment sensors;
   for each of a plurality of cells of a grid of the spatial region:
      determining, by a processing unit on the basis of the sensor data relating to the spatial region, a first measured evidence mass $(m(SD_{z,t}))$ for a first hypothesis (SD) that a cell is occupied at a current point in time (t), and a second measured evidence mass $(m(F_{z,t}))$ for a second hypothesis (F, FD) that the cell is not occupied or may not be occupied at the current point in time (t);
      predicting, by the processing unit based on a first actual evidence mass $(m(SD_{t-1}), m(S_{t-1}), m(D_{t-1}))$ for the first hypothesis (SD, S, D) at a previous point in time (t−1) and based on a second actual evidence mass $(m(F_{t-1}), m(FD_{t-1}))$ for the second hypothesis (F, FD) at the previous point in time (t−1) and based on a plurality of particles for a corresponding plurality of movement hypotheses for the cell, a first predicted evidence mass $m(\overline{SD}_t), m(\overline{S}_t), m(\overline{D}_t)$ for the first hypothesis (SD, S, D) and a second predicted evidence mass $m(\overline{F}_t), m(\overline{FD}_t)$ for the second hypothesis (F, FD) at the current point in time (t), wherein the sensor data is accumulated over time in the grid and a movement of an object is determined based on the accumulated sensor data by means of the particles; and
      determining, by the processing unit, the first actual evidence mass $(m(SD_t), m(S_t), m(D_t))$ and the second actual evidence mass $(m(F_t), m(FD_t))$ at the current point in time (t) by combining the first measured evidence mass $(m(SD_{z,t}))$ and the second measured evidence mass $(m(F_{z,t}))$ with the first predicted evidence mass $m(\overline{SD}_t), m(\overline{S}_t), m(\overline{D}_t)$ and the second predicted evidence mass $m(\overline{F}_t), m(\overline{FD}_t)$ at the current point in time (t); and
   determining, by the processing unit, a position of the object in the spatial region at the current point in time (t), based on the first actual evidence mass $(m(SD_t), m(S_t), m(D_t))$ and the second actual evidence mass $(m(F_t), m(FD_t))$ at the current point in time (t) for the plurality of cells.

2. The method according to claim 1, wherein predicting comprises:
   predicting a first statically predicted evidence mass $(m(SD'_t), m(S'_t), m(D'_t))$ at the current point in time (t) on the basis of the first actual evidence mass $(m(SD_{t-1}), m(S_{t-1}), m(D_{t-1}))$ at the previous point in time (t−1);
   determining a first dynamically predicted evidence mass $(m(\widehat{SD}_t), m(\hat{S}_t), m(\hat{D}_t))$ at the current point in time (t) on the basis of the plurality of particles; and
   determining the first predicted evidence mass $m(\overline{SD}_t), m(\overline{S}_t), m(\overline{D}_t)$ for the first hypothesis (SD, S, D) by combining the first statically predicted evidence mass $(m(SD'_t), m(S'_t), m(D'_t))$ and the first dynamically predicted evidence mass $m(\widehat{SD}_t), m(\hat{S}_t), m(\hat{D}_t)$.

3. The method according to claim 2, wherein:
   a particle is associated with a particle evidence mass; and
   determining the first dynamically predicted evidence mass $(m(\widehat{SD}_t), m(\hat{S}_t), m(\hat{D}_t))$ includes summing up the particle evidence masses of the plurality of particles in the cell.

4. The method according to claim 1, wherein:
a particle describes a movement which includes a direction of movement and a speed of movement, of a part the first actual evidence mass (m(SD$_t$, m(D$_t$) of a cell, and
the plurality of particles of the cell are particles which were defined for at least one of the plurality of cells at the previous point in time (t−1) and which, due to their movement, fall into the cell.

5. The method according to claim 1, wherein:
the method comprises, for each of the plurality of cells, distributing the first actual evidence mass (m(SD$_t$), m(D$_t$)) of the cell at the current point in time (t) to a plurality of updated particles and
wherein, for each of the plurality of cells, the plurality of updated particles at least partially comprises particles of the previous point in time (t−1) falling into the cell, and/or the plurality of updated particles at least partially comprise new particles with different movements.

6. The method according to claim 1, wherein:
evidence masses are normalized to values between 0 and 1;
a sum of a first evidence mass for the first hypothesis and a second evidence mass for the second hypothesis is less than or equal to one; and/or
combining evidence masses includes multiplying the evidence masses.

7. The method according to claim 1, wherein combining evidence masses comprises:
determining conflict evidence masses for a combination of hypotheses that contradict each other; and
allocating each of the conflict evidence masses to the first and/or second hypothesis.

8. The method according to claim 1, wherein, for each of the plurality of cells:
a first evidence mass for the first hypothesis comprises:
an S evidence mass (m(S)) for a "statically occupied", in short S, hypothesis (S) that the cell is occupied by a static object;
a D evidence mass (m(D)) for a "dynamically occupied", in short D, hypothesis (D) that the cell is occupied by a moving dynamic object; and/or
an SD evidence mass (m(SD)) for an "unknown occupied", in short SD, hypothesis (SD) that the cell is occupied by an object of which it is not known whether it is static or dynamic; and
a second evidence mass for the second hypothesis comprises:
an F evidence mass (m(F)) for a "free", in short F, hypothesis that there is no object in the cell; and/or
an FD evidence mass (m(FD)) for a "transitorily free", in short FD, hypothesis (FD) that the cell is not occupied or only temporarily occupied by a dynamic object.

9. The method according to claim 8, wherein predicting comprises:
determining a statically predicted S evidence mass (m(S'$_t$)) at the current point in time (t) on the basis of an actual S evidence mass (m(S$_{t−1}$)) at the previous point in time (t−1), as m(S'$_t$)=m(S$_{t−1}$);
determining a dynamically predicted D evidence mass (m($\hat{D}_t$)) based on a sum of particle evidence masses of the plurality of particles that fall into the cell at the current point in time (t);
determining a conflict evidence mass on the basis of the statically predicted S evidence mass (m(S'$_t$)) and the dynamically predicted D evidence mass (m($\hat{D}_t$)); and
allocating the conflict evidence mass at least partially to a predicted S evidence mass (m($\hat{S}_t$)) at the current point in time (t).

10. The method according to claim 8, wherein predicting comprises:
determining a statically predicted FD evidence mass (m(FD'$_t$)) at the current point in time (t) on the basis of an actual FD evidence mass (m(F$_{t−1}$)) at the previous point in time (t−1), on the basis of an actual F evidence mass (m(F$_{t−1}$) at the previous point in time (t−1) and on the basis of the actual D evidence mass (m(D$_{t−1}$)) at the previous point in time (t−1), as $$m(FD'_t) = \frac{m(FD_{t−1}) + m(F_{t−1})}{1 − m(D_{t−1})};$$

and
determining the predicted FD evidence mass (m($\overline{FD}_t$)) at the current point in time (t) based on the statically predicted FD evidence mass (m(FD'$_t$)) at the current point in time (t).

11. The method according to claim 8, wherein predicting comprises:
determining a statically predicted S evidence mass (m(S'$_t$)) at the current point in time (t) on the basis of an actual S evidence mass (m(S$_{t−1}$)) at the previous point in time (t−1);
determining a statically predicted SD evidence mass (m(SD'$_t$)) at the current point in time (t) on the basis of an actual SD evidence mass (m(SD$_{t−1}$)) at the previous point in time (t−1), as m(SD'$_t$)=m(SD$_{t−1}$);
determining a statically predicted FD evidence mass (m(FD'$_t$)) at the current point in time (t) on the basis of an actual FD evidence mass (m(FD$_{t−1}$)) at the previous point in time (t−1) on the basis of an actual F evidence mass (m(F$_{t−1}$)) at the previous point in time (t−1) and on the basis of the actual D evidence mass (m(D$_{t−1}$)) at the previous point in time (t−1);
determining a dynamically predicted D evidence mass (m($\hat{D}_t$)) based on a sum of particle evidence masses of the plurality of particles falling into the cell at the current point in time (t); and
combining the statically predicted S evidence mass (m(S'$_t$)), the statically predicted SD evidence mass m(SD('$_t$)) and the statically predicted ED evidence mass (m(FD'$_t$)) on the one hand with the dynamically predicted D evidence mass (m($\hat{D}_t$)) on the other hand.

12. The method according to claim 8, wherein the method comprises:
determining conflict evidence masses between a predicted S evidence mass (m($\overline{S}_t$)), a predicted D evidence mass (m($\overline{D}_t$)) and/or a predicted SD evidence mass (m($\overline{SD}_t$)) at the current time (t) on the one hand and a measured F evidence mass (m(F$_{z,t}$)) at the current point in time (t) on the other hand, as $$\zeta(\overline{M}_t, M_{z,t}) = \underbrace{m(\overline{S}_t)m(F_{z,t})}_{\zeta_1} + \underbrace{m(\overline{D}_t)m(F_{z,t})}_{\zeta_2} + \underbrace{m(\overline{SD}_t)m(F_{z,t})}_{\zeta_3};$$

and
   allocating the conflict evidence masses to an actual S evidence mass (m($S_t$)) and/or an actual F evidence mass m($F_t$)) at the current point in time (t), according to $m(S_t) \leftarrow \frac{1}{2}\zeta_1$, $m(F_t) \leftarrow \frac{1}{2}\zeta_1 + \zeta_2 + \zeta_3$.

13. The method according to claim 8, wherein the method comprises:
   determining, on the basis of predicted SD evidence mass (m($\overline{SD_t}$)) and a measured SD evidence mass (m($SD_{z,t}$)) at the current point in time (t), a non-classified evidence mass for occupancy, on the basis of $\lambda_2 = m(\overline{SD_t})m(SD_{z,t})$; and
   allocating the non-classified evidence mass for occupancy at least partially to an actual S evidence mass (m($S_t$)) and/or an actual D evidence mass (m($D_t$)) at the current point in time (t), on the basis of $m(S_t) \leftarrow \lambda_2$.

14. The method according to claim 8, wherein the method comprises:
   determining a measured residual evidence mass m($\Theta_{z,t}$) at the current point in time (t) based on a sum of the first measured evidence mass (m($SD_{z,t}$)) and the second measured evidence mass (m($F_{z,t}$));
   determining a predicted residual evidence mass (m($\overline{\Theta_t}$)) at the current point in time (t) based on a sum of the first predicted evidence mass m($\overline{SD_t}$), m($\overline{S_t}$), m($\overline{D_t}$) at the current point in time (t) and the second predicted evidence mass (m($\overline{F_t}$), m($\overline{FD_t}$) at the current point in time (t);
   determining, based on the measured residual evidence mass m($\Theta_{z,t}$), the predicted residual evidence mass (m($\overline{\Theta_t}$)), a predicted SD evidence mass (m($\overline{SD_t}$)) and a measured SD evidence mass (m($SD_{z,t}$)) at the current point in time (t), a non-classified evidence mass for occupancy, on the basis of $\lambda_1 = m(\overline{SD_t})m(\Theta_{z,t})$ and/or $\lambda_3 = m(\overline{\Theta_t})m(SD_{z,t})$; and
   allocating the non-classified evidence mass for occupancy at least partially to an actual S evidence mass (m($S_t$)), an actual D evidence mass (m($D_t$)) and/or an actual SD evidence mass (m($SD_t$)) at the current point in time (t), on the basis of m($SD_t$)←$\lambda_1$; m($D_t$)←$f_D\lambda_3$, and/or m($SD_t$)←$(1-f_D)\lambda_3$;
   wherein $f_D$ is a distribution factor.

15. The method according to claim 14, wherein the distribution factor $f_D$ depends on:
   a number and/or density of particles in a cell; and/or
   sensor data relating to a movement speed of the cell; and/or
   information from an object tracking and/or classification algorithm.

16. The method according to claim 8, wherein the method comprises:
   determining, on the basis of a predicted ED evidence mass (m($\overline{FD_t}$)) and a measured SD evidence mass (m($SD_{z,t}$)) at the current point in time (t), a possible dynamic evidence mass, on the basis of $\lambda_4 = m(\overline{FD_t})m(SD_{z,t})$; and
   allocating the possible dynamic evidence mass at least partially to an actual SD evidence mass (m($SD_t$)) and an actual D evidence mass (m($D_t$)) at the current point in time (t), on the basis of m($D_t$)←$(1-\gamma)\lambda_4 + f_D\gamma\lambda_4$ and/or m($SD_t$)←$(1-f_D)\gamma\lambda_4$,
   wherein $\gamma$ is a variable parameter between 0 and 1.

17. The method according to claim 1, wherein the method comprises, for each of the plurality of cells:
   determining an occupancy probability for the cell to be occupied at the current point in time (t) by the object already detected at the previous point in time (t−1);
   wherein the occupancy probability is determined based on a state of the object at the previous point in time (t−1); and
   allocating the cell to the object depending on the first evidence mass and depending on the occupancy probability.

* * * * *